(12) United States Patent
Larumbe et al.

(10) Patent No.: US 10,348,630 B2
(45) Date of Patent: Jul. 9, 2019

(54) LOAD BALANCING BASED ON LOAD PROJECTIONS FOR EVENTS

(71) Applicant: Facebook, Inc., Menlo Park, CA (US)

(72) Inventors: Federico Daniel Larumbe, Mountain View, CA (US); Dejan Curcic, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 130 days.

(21) Appl. No.: 15/495,889

(22) Filed: Apr. 24, 2017

(65) Prior Publication Data
US 2018/0309682 A1    Oct. 25, 2018

(51) Int. Cl.
*H04L 12/803* (2013.01)
*H04L 12/24* (2006.01)
*H04L 12/26* (2006.01)
*H04L 29/08* (2006.01)
*H04L 12/801* (2013.01)
*G06N 20/00* (2019.01)

(52) U.S. Cl.
CPC .......... *H04L 47/125* (2013.01); *G06N 20/00* (2019.01); *H04L 41/147* (2013.01); *H04L 43/0817* (2013.01); *H04L 47/122* (2013.01); *H04L 47/127* (2013.01); *H04L 67/101* (2013.01); *H04L 67/1008* (2013.01); *H04L 41/16* (2013.01)

(58) Field of Classification Search
CPC ... H04L 47/125; H04L 47/127; H04L 47/122; H04L 43/0888; H04L 43/16; H04L 41/145; H04L 41/147
See application file for complete search history.

(56) References Cited

U.S. PATENT DOCUMENTS

| | | | |
|---|---|---|---|
| 6,522,636 B1* | 2/2003 | Hogberg | H04B 7/18519 370/316 |
| 2002/0126669 A1* | 9/2002 | Tuck | H04L 12/4625 370/390 |
| 2014/0143492 A1* | 5/2014 | Eckert | G06F 12/0802 711/118 |
| 2014/0258546 A1* | 9/2014 | Janssens | G06F 9/5088 709/226 |
| 2015/0085656 A1* | 3/2015 | Kersch | H04L 47/823 370/235 |
| 2015/0271727 A1* | 9/2015 | Harrang | H04W 36/22 370/229 |

* cited by examiner

*Primary Examiner* — Rasheed Gidado
(74) *Attorney, Agent, or Firm* — FisherBroyles, LLP

(57) ABSTRACT

A computing system operates according to a method including: identifying communication of data; determining a current load measure for characterizing an egress measure associated with the data at a current time; generating a load projection for characterizing the egress measure at the access point corresponding to a future time; and generating an assigned address based on the load projection.

17 Claims, 4 Drawing Sheets

LOAD BALANCING BASED ON LOAD PROJECTIONS FOR EVENTS

BACKGROUND

Social networking services are online services that execute on various computing systems and can be accessed by users to communicate with each other, share their interests, upload images and videos, create new relationships, etc. The computing systems can operate in a distributed computing environment with data being distributed among one or more server clusters that are each located in one of multiple data centers. A server cluster is a grouping of server computing devices ("servers").

The servers can correspond to one or more access points on a network, with each access point including one or more servers or devices functioning as proxy nodes. The access points and the proxy nodes can be utilized as part of an architecture, a protocol, or a combination thereof for exchanging information between computing devices over the network.

Operators of social networks typically employ multiple interconnected data centers, e.g., so that a data center that is geographically proximate to a social network user can respond to the user's requests. This mode of operation can minimize network delays.

However, during periods of high demand, e.g., from a particular geographic area, one or more nearby data centers may become heavily used and so may not provide responses in a timely manner. To avoid these types of delays, operators of social networks employ various load balancing techniques.

When load balancing is employed, a request to a datacenter may be redirected to a different data center that also stores the requested content, even if that other datacenter is farther away.

Some social networks host "live" events. These live events can involve interactions with celebrities. In such cases, the "load" experienced by some datacenters can increase much more rapidly than typical load balancers can handle. This can be because by the time a client request is satisfied by a datacenter the load balancer selects, the selected datacenter may become too congested to respond to the request in a timely manner. As such, there is a need to balance loads based on events occurring in real-time to promote optimum operation of the computing system.

Figure 1:
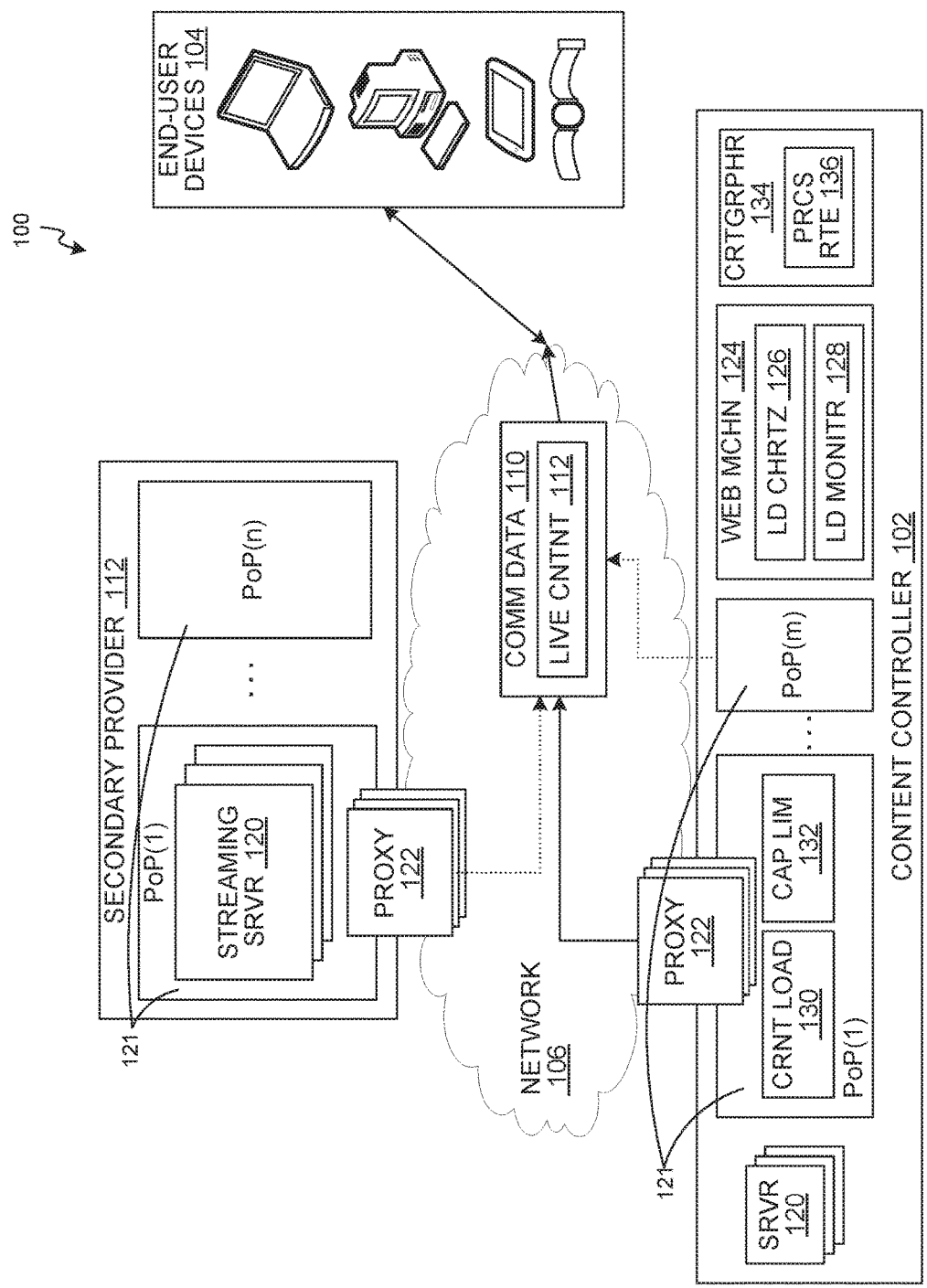
FIG. 1 is block diagram illustrating an overview of a computing system in which some embodiments may operate.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Various embodiments are directed to balancing a load or an "egress measure" at one or more access points, such as for one or more point of presence (PoP), for a computing system, such as for a communication system or a social-networking service. The computing system includes one or more devices, such as across one or more servers, one or more end-user devices, or a combination thereof configured to balance the egress measure based on or in response to events occurring in real-time to prevent overloading of the access points. An egress measure is a term of art for a measure of data that exits a data communications network, e.g., at an access point.

For the various embodiments, the computing system is configured to predict or project loads beyond current time in response to the event. The computing system can predict or project based on patterns, such as for one or more predetermined models or based on calculation results of the computing system. Based on comparing the predicted or projected loads to thresholds or capacity limits of a corresponding access point, the computing system can generate one or more addresses directing devices to use a different access point, a secondary provider, such as a secondary content delivery network (CDN).

In some embodiments, such as for social networking services, the servers can facilitate live or real-time communication, such as for streaming video servers. A network of streaming servers can further facilitate communication, such as point-to-point or broadcast, by receiving content, such as streaming video, from a sender and sending the contend to recipients in real-time. When the communication has many recipients, such as when the content or the sender is popular and draws a large number of recipients desiring to concurrently access the content, the network of streaming servers can become overloaded. The computing system can predict or project, at a current time, the number of recipients that will or likely access the content at a future time through a particular access point. The computing system can redirect devices requesting to access the content at or after the current time to a different access point, a secondary CDN, or a combination thereof.

In some embodiments, the computing system can predict or project using a load characterization mechanism. The load characterization mechanism is a method, a process, a function, a circuit, an instruction, a configuration or a combination thereof for projecting the egress measure at the access point using various information. For example, the load characterization mechanism can use a current load measure, one or more previous load measures, context associated with the communication content, or a combination thereof as input parameters. Also for example, the load characterization mechanism can use curve fitting, curve-type matching, curve calculation, machine-learning, or a combination thereof to project or predict the load beyond the current time.

Referring now to the figures, FIG. 1 is block diagram illustrating an overview of a computing system 100 in which some embodiments may operate. The computing system 100 can include a social networking system 100. The computing system 100 can include a communication controller 102 connecting to end-user devices 104 through an external network 106.

The communication controller 102 can include a circuit, a devices, a system, a function, or a combination thereof configured to manage communication or exchange of data between devices. For example, the communication controller 102 can correspond to a social networking service, a telecommunication service, a wireless communication service, an internet service provider (ISP), or a combination thereof. As a more specific example, the communication controller 102 can include a data center, a mainframe computer, a server, or a combination thereof.

For illustrative purposes, the communication controller 102 is discussed below in relation to a social networking service and the computing system 100 as the social networking system 100. However, it is understood that the computing system 100 and the various embodiments discussed below can be applied to contexts or usage outside of social networking contexts, such as for load-balancing at base stations, routers or switches.

The end-user devices 104 can include one or more client computing devices (e.g., a wearable device, a mobile device, a desktop computer, a laptop, etc.,). The end-user devices 104 may operate in a networked environment using logical connections to one or more remote computers. The end-user devices 104 can connect to each other or other end-user devices 104, the communication controller 102, or a combination thereof. The end-user devices 104 can connect using the external network 106.

The external network 106 can include wired or wireless networks connecting various devices for communicating or exchanging data. For example, the external network 106 can include local area networks (LAN), wide area networks (WAN), wireless fidelity (WiFi) network, fiber optic networks, cellular network, the Internet, or a combination thereof.

The social networking system 100 can facilitate exchange of communication data 108, such as data corresponding to text, sound, image, or a combination thereof, between various devices. As a more specific example, the communication data 108 can include live streaming content 110. The live streaming content 110 can include data corresponding to sound and video configured to be presented or recreated at the end-user devices 104 while being delivered by a provider. The live streaming content 110 can be configured to be presented or recreated as the end-user devices 104 receive the live streaming content 110 rather than presenting or recreating from previously stored data. The live streaming content 110 can include representation of real-time event occurring or ongoing "live" or simultaneously as the communication and presentation thereof.

For example, the social networking system 100 can communicate the live streaming content 110. The social networking system 100 can receive the live streaming content 110 from one of the end-user devices 104 and send the live streaming content 110 in real-time to a set of different end-user devices 104.

The computing system 100 can facilitate the communication of the live streaming content 110 through the communication controller 102 or through a secondary provider 112. The secondary provider 112 is a set of circuits, devices, functions, services, or a combination thereof configured to provide duplicate or copied content. The secondary provider 112 can be coupled to the communication controller 102.

The secondary provider 112 can provide a copy or a duplicate of the communication data 108 managed or controlled by the communication controller 102. The secondary provider 112 can provide the communication data 108 to the end-user devices 104 in addition to or instead of the communication controller 102. The secondary provider 112 can be leveraged to provide the communication data 108 to provide relief and prevent overloading of the communication controller 102. The secondary provider 112 can be leveraged to provide the communication data 108 for faster access based on geographical or network constraints.

The secondary provider 112 can include a secondary CDN, such as a shadow content provider. As an illustrative example, the secondary provider 112 can correspond to suitable commercially available services or entities.

The communication controller 102, the secondary provider 112, or a combination thereof can include and utilize servers 120, such as streaming servers, or other types of computing devices corresponding to access points 121. The access points 121 are interface points between communicating entities. For example, the access points 121 can include devices such as servers, routers, gateways, base stations, cell towers, switches, or a combination thereof. Also for example, the access points 121 can include PoP located within or outside the data centers, and with each including one or more proxy nodes 122.

The proxy nodes 122 can include servers acting as an intermediary for requests from the end-user devices 104. The proxy nodes 122 can process communication of the communication data 108, including handling requests for the communication data 108.

The computing system 100 can further include and utilize web instances or machines 124 for internet communication. The web machines 124 can include "webby" or other content management system that facilitates communication through web pages or web sites, such as for World Wide Web. The web machines 124 can include web servers.

For the computing system 100, the communication controller 102 can include a network of streaming servers 120 having a common access point 121. When recipients desire to access the communication data 108, the corresponding end-user devices 104 can be directed to an address or a uniform resource locator (URL) for one of the proxy nodes 122 of the access point 121 by the web machines 124. The end-user devices 104 can use the URL from the web machines 124 to interface with the proxy nodes 122 and access the communication data 108.

The computing system 100 can include a load characterizer 126, a load monitor 128, or a combination thereof. The load monitor 128 is a method, a process, a function, a circuit, an instruction, or a combination thereof configured to determine a current load measure 130 representing or characterizing a current demand or a current usage of one or more of resources in the computing system 100, such as for the access points 121. For example, the load monitor 128 can include circuitry configured to determine the current load measure 130 based on measuring an amount of traffic, such as in bits per second, across all of the proxy nodes 122 corresponding to one or each of the access points 121.

The load characterizer 126 is a method, a process, a function, a circuit, an instruction, or a combination thereof configured to project or predict the demand or the usage metric likely expected at a later time. The load characterizer 126 can project or predict based on current results from the load monitor 128. The load characterizer 126 and the load monitor 128 can process the load corresponding to the communication data 108.

The computing system 100 can manage the load based on the projection or the prediction thereof. The computing system 100 can compare the projection or the prediction of the load to a capacity threshold 132. The capacity threshold 132 can represent a limit associated with managing a burden or a load on one or more of the computing resources. For example, the capacity threshold 132 can be associated with a capability, such as a processing speed or a memory size, of the access points 121 or the proxy nodes 122 therein.

The computing system 100 can manage the load by redirecting traffic or providing to the end-user devices 104 URLs to a different access node, the secondary provider 112, or a combination thereof. The computing system 100 can redirect or provide corresponding URLs when the projection or the prediction meets or exceeds the capacity threshold 132. The load characterizer 126, the load monitor 128, or a combination thereof can be included with various devices or segments within the computing system 100, such as included in each of the web machines 124, the servers 120, the access points 121, or a combination thereof.

The computing system 100 can manage the load in addition to or separate from a network topology controller mechanism 134 (labeled as "cartographer" in the Figure). The network topology controller mechanism 134 can include a circuit, a method, a process, a function, or a combination thereof configured to control traffic or assign addresses. The network topology controller mechanism 134 can control or assign based on geographic locations of devices or known network conditions. The network topology controller mechanism 134 can control or assign independent of current or real-time situation or load.

The network topology controller mechanism 134 can further operate or be implemented at a network topology controller processing rate 136. The network topology controller processing rate 136 can represent timing or frequency for operating or implementing the network topology controller mechanism 134. The network topology controller processing rate 136 can be in order or units of magnitude of hours, days, or of greater magnitude. As such, the computing system 100 can further manage the load in addition to or separate from the network topology controller mechanism 134 to deal with loads associated with real-time events, such as for the live streaming content 110. Details for the management of the load are discussed below.

It should be noted that the term "server" as used throughout this application refers generally to a computer, an electronic device, a program, or any combination thereof that processes and responds to requests (e.g., from the end-user devices 104 or from other servers). Servers can provide data to the requesting "clients." The term "client" as used herein refers generally to a computer, a program, an electronic device, or any combination thereof that is capable of processing and making requests and/or obtaining and processing any responses from servers. Client computing devices and server computing devices may each act as a server or client to other server/client devices.

Figure 2:
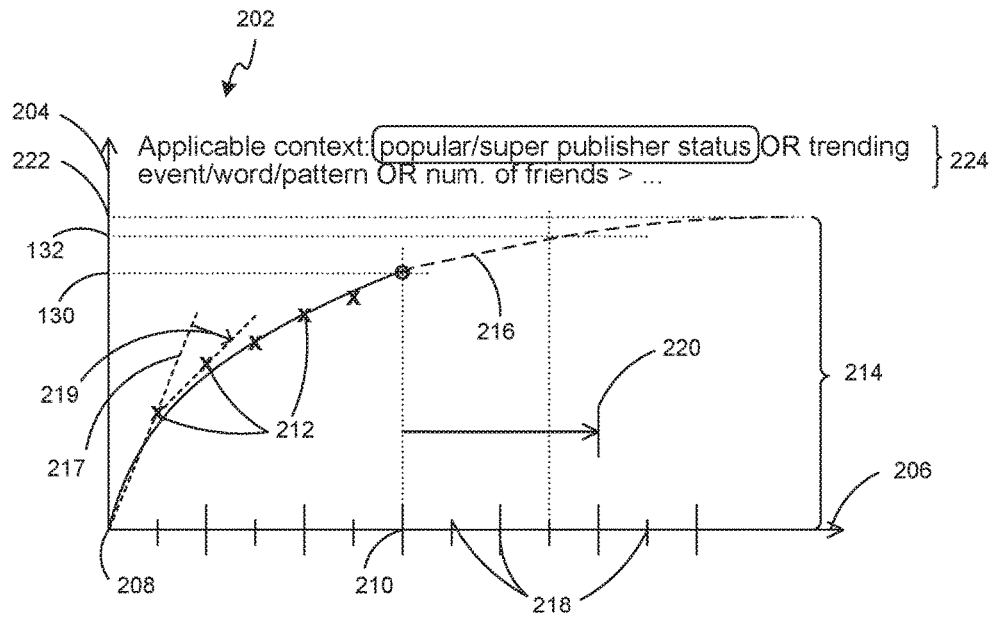
FIG. 2 is an example illustration of a load behavior profile for the access point of FIG. 1, in accordance with various embodiments.

FIG. 2 is an example illustration of a load behavior profile 202 for the access point 121 of FIG. 1, in accordance with various embodiments. The load behavior profile 202 is a description or a characterization of a demand or usage of a corresponding resource, such as the access point 121. For example, the load behavior profile 202 can describe the load or an egress measure 204 at the access point 121.

The egress measure 204 can be a quantitative representation of load, demand or usage of the corresponding resource. The egress measure 204 can represent traffic associated with the communication controller 102 of FIG. 1 or a portion therein, such as a particular instance of the access point 121. The egress measure 204 can be amount of traffic in bits per second. The egress measure 204 can be represented along a vertical direction or axis as illustrated in FIG. 2.

The load behavior profile 202 can characterize or describe the load with respect to time. For the communication data 108 of FIG. 1, the computing system 100 of FIG. 1 can generate the load behavior profile 202 associated with a content time 206.

The content time 206 can represent moments associated with exchange of the communication data 108. For example, the content time 206 can begin with a content start time 208, representing the initiating or starting moment for broadcasting the live streaming content 110 of FIG. 1. The content time 206 can represent moments or durations relative to the content start time 208.

The content time 206 can be represented along a horizontal direction or axis as illustrated in FIG. 2. The content time 206 can be measured in seconds, minutes, hours, or a combination thereof. For discussion purposes, the computing system 100 will be described as sampling based on a predetermined period in seconds, such as between 1-59 seconds. However, it is understood the computing system 100 can sample or determine the load using periods less than a second or using a period meeting or exceeding a minute. The sampling or processing rate or period for balancing loads based on real-time events can correspond to response or processing times for communicating the communication data 108.

The computing system 100 can sample or determine the load at a current time 210. The computing system 100 can determine the current load measure 130 as the load at the current time 210. The computing system 100 can use the load monitor 128 of FIG. 1 to determine the current load measure 130. The computing system 100 can determine the current load measure 130 based on aggregating the load across all instances of the proxy nodes 122 of FIG. 1 for the corresponding access point 121.

The computing system 100 can store the current load measure 130 for latter access. The stored load measurements can be previous load measures 212 representing the load measurements or the egress measure 204 that occurred at a prior moment before the current time 210.

The computing system 100 can calculate a load profile 214 for the load behavior profile 202. The load behavior profile 202 can include the load profile 214 representing a pattern of the egress measure 204 over time.

The computing system 100 can calculate the load profile 214 based on the previous load measures 212, the current load measure 130, or a combination thereof. For example, the computing system 100 can calculate the load profile 214 as a line connecting the previous load measures 212 and the current load measure 130, as illustrated in FIG. 2.

The load behavior profile 202 can further calculate the load profile 214 including a load projection 216. The load projection 216 is an estimate of the load for the corresponding component or device at a future time 218 after the current time 210. The load projection 216 can include a portion of the load profile 214 extending beyond the current time 210. The load projection 216 is illustrated using larger-dashed line in FIG. 2.

The computing system 100 can calculate or generate the load profile 214, the load projection 216, or a combination thereof using a variety of ways. For example, the computing system 100 can fit a model line or behavior to the previous load measures 212, the current load measure 130, or a combination thereof. Also for example, the computing system 100 can select a model line or behavior based on the previous load measures 212, the current load measure 130, or a combination thereof, and then fit the model line or behavior to one or more of the measurements.

Also for example, the computing system 100 can use a polynomial solver to extrapolate the load profile 214, the load projection 216, or a combination thereof from the previous load measures 212, the current load measure 130, or a combination thereof. Also for example, the computing system 100 can use machine learning to recognize and extrapolate a pattern the previous load measures 212, the current load measure 130, or a combination thereof.

Also for example, the computing system 100 can calculate one or more derivatives associated with the previous load measures 212, the current load measure 130, or a combination thereof. The derivatives can be used to fit and/or select models, lines, or behaviors, or used to process further calculations or processing for the polynomial solver or the machine learning process to calculate or generate the load profile 214, the load projection 216, or a combination thereof.

As a more specific example, the computing system 100 can calculate a first derivative measure 217 as a speed of change for the egress measure 204. Also as a more specific example, the computing system 100 can calculate a second derivative measure 219 as acceleration or a rate of change of speed for the egress measure 204. As illustrated in FIG. 2, first derivative measure 217 is illustrated using smaller-dashed lines in FIG. 2 and the second derivative measure 219 is illustrated as a change in slope of the smaller-dashed lines.

The computing system 100 can balance the loads in facilitating exchange of the communication data 108. The computing system 100 can balance the loads based on the load behavior profile 202 or a portion therein.

For example, the computing system 100 can balance the loads based on the load projection 216. The computing system 100 can anticipate future demand using the load projection 216 and balance accordingly. The computing system 100 can balance based on the load projection 216 instead or in addition to the current load measure 130.

As a more specific example, the computing system 100 can balance the loads based on a comparison time threshold 220. The comparison time threshold 220 can represent a duration beyond the current time 210 relevant for balancing the load. The comparison time threshold 220 can be based on a time corresponding to the load projection 216, such as a maximum or latest time or a time window with accuracy or confidence level exceeding a predetermined threshold.

The comparison time threshold 220 can further include a predetermined time window. The comparison time threshold 220 can be based on a processing time for exchanging the communication data 108. The comparison time threshold 220 can be one or more orders of magnitude or unit less than the network topology controller processing rate 136. For example, the comparison time threshold 220 can be in minutes or less.

The computing system 100 can compare the load projection 216 to the capacity threshold 132 within the comparison time threshold 220. The computing system 100 can redirect traffic away from the corresponding access point 121 when the load projection 216 at the corresponding access point 121 meets or exceeds the capacity threshold 132 within the comparison time threshold 220.

The computing system 100 can further calculate a peak load 222. The peak load 222 can be the maximum value of the egress measure 204 within a given set or segment. For example, the peak load 222 can be within or for the comparison time threshold 220. Also for example, the peak load 222 can be within or for the content time 206. The computing system 100 can further manage the load according to the peak load 222.

The computing system 100 can further determine a communication context 224 associated with the communication data 108. The communication context 224 can include information describing a general situation surrounding the communication data 108.

For example, the communication context 224 can represent a location, a time, a meaning or significance, a subject matter, a category or a type, a reason, a goal, a purpose, a description, or a combination thereof for content of the communication data 108. Also for example, the communication context 224 can describe a publisher, a content generator, a participant, a description or a trait thereof, or a combination thereof.

As a more specific example, the communication context 224 can include a connection between the content and a current event, one or more participants of the broadcasted event, a time or a location of the broadcasted event, a title of the event, a number of previous viewers, or a combination thereof. Also as a more specific example, the communication context 224 can include a profession or a title, a number of friends or followers, a number of average visitors or viewers, a classification or a rating, or a combination thereof associated with one or more participants or uploading user of the broadcasted event.

Figure 3:
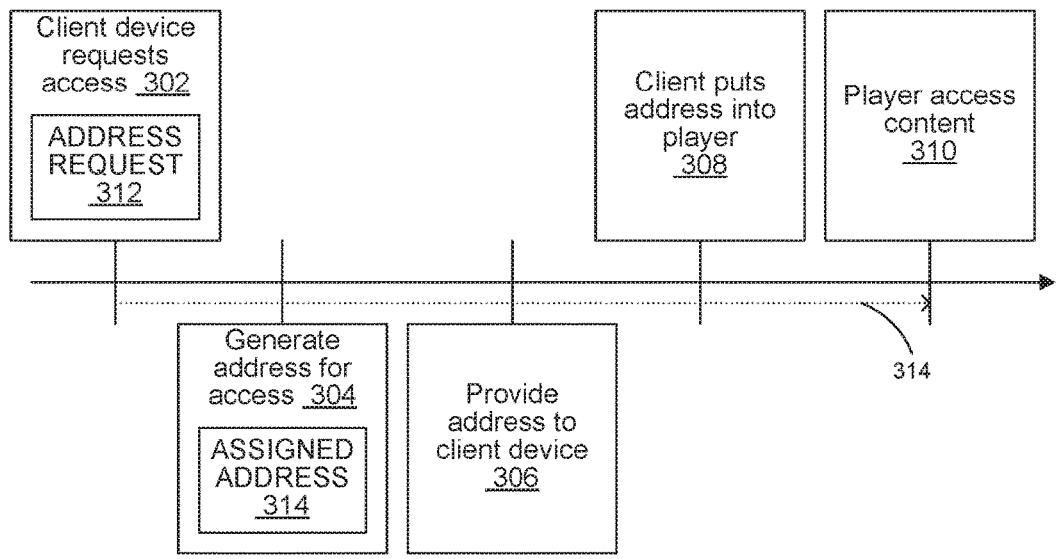
FIG. 3 is an example data flow diagram for communicating the communication data, in accordance with various embodiments.

FIG. 3 is an example data flow diagram for communicating the communication data, in accordance with various embodiments. The computing system 100 of FIG. 1 can facilitate or begin communication of the communication data 108 of FIG. 1 based on an exchange illustrated in FIG. 3.

The computing system 100 can begin the exchange based on the end-user device 104 of FIG. 1 requesting to access the communication data 108, such as the live streaming content 110 of FIG. 1. The end-user device 104 can send an address request 312 to the communication controller 102 of FIG. 1 or a portion therein as illustrated in block 302.

The communication controller 102 can receive the address request 312. The communication controller 102 can generate an assigned address 314 as illustrated in block 304. The assigned address 314 can provide or facilitate a connection between the requesting end-user device 104 and a resource for providing access to the communication data 108. For example, the assigned address 314 can include the URL for accessing the communication data 108.

The communication controller 102 can generate the assigned address 314 for directing the requesting end-user device 104 to an initially designated resource, such as an initially designated instance of the access point 121 of FIG. 1, another or secondary resource, such as a different access point 121 or the secondary provider 112 of FIG. 1. The communication controller 102 can generate the assigned address 314 based on the load projection 216 of FIG. 2. Details regarding generation of the assigned address 314 are discussed below.

After generating the assigned address 314, the communication controller 102 can provide the address to the requesting end-user device 104 as illustrated in block 306. For example, the web machine 124 of FIG. 1 can give the URL reflecting where the communication controller 102 wants the user to go to get the live streaming content 110.

At block 308, the client device can put the assigned address 314 into a device, a function, an application, or a combination thereof configured to access and produce the communication data 108. The requesting end-user device 104 can put the URL into a player for accessing and playing the communication data 108.

At block 310, the player can start fetching the communication data 108 or segments thereof and reproducing the images, the sounds, the text, or a combination thereof at the requesting end-user device 104. For example, the player on the requesting end-user device 104 can start fetching segments of video for the live streaming content 110. Block 310 can represent communication of the communication data 108 to the user.

A response time 316 can be measured between blocks 302 and 310, or from exchange of the address request 312 to when the player starts fetching the communication data 108. The response time 316 can further include or correspond to dead-time.

The response time 316 can be in the order of seconds. The response time 316 is in one or more magnitudes or units smaller than the network topology controller processing rate 136 of FIG. 1.

For certain types of the communication data 108, the number of requesting users can be very large. Moreover, the number of requesting users can grow at a rapid rate.

For example, the live streaming content 110 published by popular users, such as celebrities or power users, can draw large number of viewers. Also for example, popular content, such as anticipated software or particular sporting events or shows, can similarly draw large number of viewers or consumers. Also for example, content relevant to a current event or trend can further draw large number of viewers or consumers.

Due to the network topology controller processing rate 136, the network topology controller mechanism 134 is insufficient to account for such dynamic changes in the number of users requesting to access the communication data 108. Failure to correctly account for the number of users can overload the access points 121, which can slow down overall performance of the computing system 100, withhold the communication data 108 from the requesting users, disrupt service, or a combination thereof.

It has been discovered that generating the assigned address 314 based on dynamically generated the load projection 216 provides facilitation of large number of users or large increase in the number of users requesting to access the communication data 108. The computing system 100 can dynamically generate the load projection 216 within or less than the response time 316 using the current load measure 130 of FIG. 1, the previous load measures 212 of FIG. 2, or a combination thereof. The load projection 216 can even account for the dead time or the response time 316 and shed loads when necessary. Typically the response time 316 is in seconds, and is less than a minutes.

Figure 4:
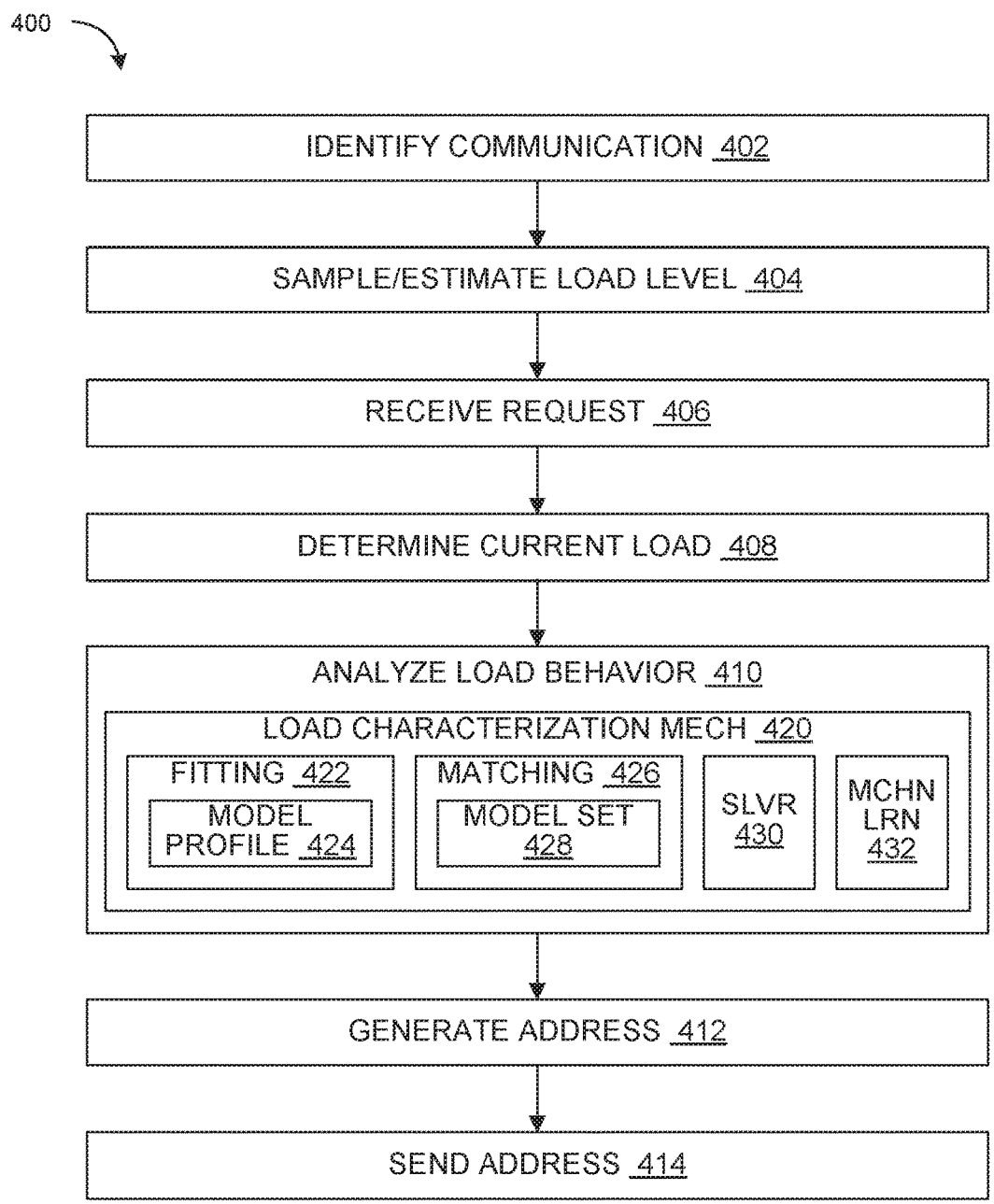
FIG. 4 is a flow chart illustrating a method of operating the computing system of FIG. 1, in accordance with various embodiments.

FIG. 4 is a flow chart illustrating a method 400 of operating the computing system 100 of FIG. 1, in accordance with various embodiments. The computing system 100 can include the communication controller 102 of FIG. 1 facilitating or enabling users to communicate the communication data 108 of FIG. 1.

For example, users can broadcast the live streaming content 110 of FIG. 1, such as a broadcast by an individual such as a celebrity, a politician, a professor or a teacher, or by an entity such as a broadcast station or a studio. Also for example, users can access the communication data 108 for video conference. Also for example, the users can access the communication data 108 for downloading or streaming stored content, such as for music or movie files, software packages or applications, or a combination thereof. Also for example, the users can access the communication data 108 for playing games, such as for massively multiplayer online (MMO) games.

At block 402, the computing system 100 can identify communication of data. The computing system 100, such as the social networking system 100, can identify ongoing or scheduled communication of the communication data 108. The computing system 100 can identify the communication in a variety of ways.

For example, the computing system 100 can determine that communication data 108 is being generated by a user, uploaded to the communication controller 102, or a combination thereof. Also for example, the computing system 100 can determine that invitations, notices, links, advertisements, or a combination thereof associated with or describing the communication data 108 were posted or exchanged between users.

The computing system 100 can further determine the communication context 224 of FIG. 2 associated with the communication data 108. The computing system 100 can determine the communication context 224 based on analyzing information or parameters regarding the user uploading or participating in the communication data 108. The computing system 100 can further determine the communication context 224 based on analyzing information describing the communication context 224. For example, the computing system 100 can analyze the corresponding users' profile information, notices or invitations for accessing or partaking in the communication data 108, or a combination thereof.

At block 404, the computing system 100 can sample or estimate load levels associated with the communication data 108. The computing system 100 can sample or estimate load levels characterizing the egress measure 204 of FIG. 2 at the access point 121 of FIG. 1 of the computing system 100.

The computing system 100 can sample load levels based on determining the current load measure 130 of FIG. 1 of an ongoing or initiated exchange of the communication data 108, and storing the measure as the previous load measures 212 of FIG. 2. The computing system 100 can further estimate the current load measure 130 before or leading up to exchange of the communication data 108. The computing system 100 can further estimate the current load measure 130 at the content start time 208 of FIG. 2 or afterwards.

The computing system 100 can sample real-time load levels for the corresponding access point 121 facilitating communication of the communication data 108 as the current load measure 130. The computing system 100 can determine the current load measure 130 using the load monitor 128 of FIG. 1 to measure loads for all of the proxy nodes 122 of FIG. 1, the web machines 124 of FIG. 1, or a combination thereof of the access point 121. The communication 100 can share or access the load measurements across the proxy nodes 122, the web machines 124, or a combination thereof, such as by using memcache. The communication 100 can aggregate the load measurements across the proxy nodes 122, the web machines 124, or a combination thereof for the access point 121 to determine the current load measure 130.

The computing system 100 can estimate the load measurements for the access point 121. The computing system 100 can determine the access point 121 designated or likely to be designated for facilitating the communication. The computing system 100 can determine the corresponding access point 121 based on the scheduled publishing user, the communication context 224, or a combination thereof.

For example, the computing system 100 can determine or estimate the corresponding access point 121 according to a location of the publishing user, the network topology controller mechanism 134 of FIG. 1, or a combination thereof. The computing system 100 can estimate an average load or use a predetermined load for the communication data 108. The computing system 100 can further determine a number of users at the content start time 208, such as number of users that have accepted the invite or have schedules items for accessing the communication. The computing system 100 can also estimate the number of users at the content start time 208, such as based on a predetermined number matching the communication context 224, previous broadcasts matching the communication context 224, or a combination thereof.

At block 406, the computing system 100 can receive the address request 312 of FIG. 3. The overall exchange to access the communication data 108 of FIG. 1 for a specific end-user can begin as illustrated in FIG. 3. Blocks 406-412 can be a detailed example for generating the assigned address 314 of FIG. 3 as illustrated in the block 304 of FIG. 3, and block 412 can correspond to providing the address as illustrated in the block 306 of FIG. 3.

The computing system 100 can receive the address request 312 from interfacing with the user through the corresponding end-user device 104 of FIG. 1. The computing system 100 can further receive the address request 312 at the communication controller 102, such as at one of its servers 120 of FIG. 1, one of the proxy nodes 122, one of the web machines 124, or a combination thereof. The address request 312 can be exchanged between the end-user device 104 and the communication controller 102 through the external network 106 of FIG. 1.

At block 408, the computing system 100 can determine the current load in response to the address request 312. The computing system 100 can determine the current load based on determining the current load measure 130 as described above for the block 404, but in response to the address request 312.

The current time 210 of FIG. 2 for the current load measure 130 can be associated with time of receiving the address request 312. The computing system 100 can determine the current load measure 130 for characterizing the egress measure 204 associated with the communication data 108 at the current time 210, such as the number of bits facilitated by the access point 121 at the current time 210.

The computing system 100 can further determine the current load measure 130 as the most recently sampled measure. The computing system 100 can retain the current load measure 130 until subsequent sampling operation. When the address request 312 is received, the retained instance of the current load measure 130 can be determined and used for subsequent processing.

At block 410, the computing system 100 can analyze behavior or pattern of the loads. The computing system 100 can analyze the behavior or the pattern for the loading by generating the load behavior profile 202 of FIG. 2 including the load profile 214 of FIG. 2 with the load projection 216 of FIG. 2 beyond or after the current time 210.

The computing system 100 can calculate the load profile 214 fitting or matching the previous load measures 212, the current load measure 130, or a combination thereof. The computing system 100 can generate the load projection 216 for characterizing the egress measure 204 estimated or likely to occur at the access point 121 corresponding to the future time 218 after the current time 210. The computing system 100 can generate the load projection 216 for representing the egress measure 204 at the access point 121 of the communication controller 102.

The computing system 100 can use the measurements from the load monitor 128 to calculate or generate the load profile 214. The computing system 100 can use the load characterizer 126 corresponding to one or more processors, the servers 120, the web machines 124, the proxy nodes 122, or a combination thereof of or associated with the corresponding access point 121 to calculate or generate the load profile 214.

The computing system 100 can access or read the previous load measures 212, the current load measure 130, or a combination thereof to generate the load behavior profile 202. The computing system 100 access or read a set of the previous load measures 212, such as the most recent or last set of measurements as predetermined by the computing system 100. The computing system 100 can further access or read all of the previous load measures 212 for the communication data 108 or the content time 206 of FIG. 2.

The computing system 100 can calculate or generate the load profile 214, the load projection 216, or a combination thereof according to the previous load measures 212, the current load measure 130, or a combination thereof. The computing system 100 can calculate or generate the load profile 214, the load projection 216, or a combination thereof in a variety of ways. The computing system 100 can generate the load projection 216 as part of the load profile 214 calculated using a variety of ways, or based on extrapolating the load projection 216 using a load characterization mechanism 420 corresponding to a variety of ways. The load characterization mechanism 420 is a method, a process, a function, a circuit, an instruction, a configuration or a combination thereof for identifying a pattern in the load over time. The load characterization mechanism 420 can project the egress measure 204 at the access point 121 using various information.

For example, the computing system 100 can calculate or generate the load profile 214, the load projection 216, or a combination thereof based on fitting known lines or patterns, selecting a particular pattern or distribution and then fitting, or a combination thereof. Also for example, the computing system 100 can calculate or generate the load profile 214, the load projection 216, or a combination thereof based on using a solver to directly calculate the results, or based on machine-learning, or a combination thereof.

In some embodiments the computing system 100 can calculate or generate the load profile 214, the load projection 216, or a combination thereof based on the load characterization mechanism 420 configured to implement a pattern fitting mechanism 422. The pattern fitting mechanism 422 is a method, a process, a function, a circuit, an instruction, a configuration or a combination thereof for resizing or reshaping a given pattern to match a set of data.

The pattern fitting mechanism 422 can fit a model profile 424 representing the given pattern according to the previous load measures 212, the current load measure 130, a derivative thereof, or a combination thereof. The model profile 424 is a specific pattern, behavior, or a model for describing a set of data, such as for the previous load measures 212, the current load measure 130, or a combination thereof.

For example, the model profile 424 can include a spline model, such as for a cubic spline function. Also for example, the model profile 424 can include an arithmetic progression or a linear model, an exponential growth/decay model, a hyperbolic growth/decay model, a logarithmic growth/decay model, or a combination thereof. Also for example, the model profile 424 can include Rayleigh or a Gaussian type model or shape.

As a more specific example, the model profile 424 can include a predetermined shape or pattern specific to a type of the communication data 108, a particular instance of the communication context 224, or a combination thereof. The model profile 424 can include a pattern of load behavior over time for the live streaming content 110 sourced or transmitted by a user with a status of a popular or a well-known user.

The computing system 100 can fit the curve based on manipulating the model profile 424 to match or be near the data points. The computing system 100 can manipulate the model profile 424 without changing the overall shape or ratio between points or lines.

For example, the computing system 100 can shift the curve for the model profile 424 in time or in levels, such as in horizontal directions or vertical directions for illustrated curve in FIG. 2. Also for example, the computing system 100 can scale or stretch the curve in the horizontal or vertical directions. Also for example, the computing system 100 can change slopes or curvatures to a general set of points, while maintaining the overall shape or profile of the pattern. Also for example, the computing system 100 can change or manipulate specific portions or aspects of the model profile 424.

The computing system 100 can apply offsets, factors, control signals or parameters, or a combination thereof to manipulate the curve. The computing system 100 can further use an accuracy measure to evaluate a fit between the curve or the pattern and the measurements. The accuracy measure can be fed back to the pattern fitting mechanism 422 to manipulate the curve or the pattern of the model profile 424.

As an illustrative example, the computing system 100 can calculate or generate the load profile 214, the load projection 216, or a combination thereof based on using the model profile 424 of a spline profile. The spline profile can be predetermined by the computing system 100 to have a shape or parameters generally matching load pattern or behavior for the communication context 224 of the live streaming content 110 broadcasted by a user with a popular or widely-followed status.

Continuing with the illustrative example, the computing system 100 can calculate the load profile 214 based on resizing or otherwise manipulating the model profile 424 to fit the previous load measures 212, the current load measure 130, or a combination thereof. The computing system 100 can generate the load projection 216 as portion of the resized or manipulated model profile 424 extending beyond the current time 210.

Also as an illustrative example, the computing system 100 can calculate a derivative measure, such as the first derivative measure 217 of FIG. 2, the second derivative measure 219 of FIG. 2, or a combination thereof. The computing system 100 can calculate the derivative measure based on the previous load measures 212, the current load measure 130, or a combination thereof. The computing system 100 can further calculate the derivative measure at or attributed to one or more of the previous load measures 212, the current load measure 130, or a combination thereof.

Continuing with the illustrative example, the computing system 100 can calculate the load profile 214 based on line-fitting according to the derivative measure. The computing system 100 can calculate the load profile 214 based on resizing or otherwise manipulating the model profile 424 to fit the derivative measure along with the previous load measures 212, the current load measure 130, or a combination thereof.

In some embodiments, the computing system 100 can use a model matching mechanism 426 to select the model profile 424 from within a behavior model set 428, and then fit the model profile 424 as discussed above. The model matching mechanism 426 is a method, a process, a function, a circuit, an instruction, a configuration or a combination thereof for selecting a specific right model or pattern type appropriate for the communication data 108. The behavior model set 428 is a grouping including one or more models or pattern types describing possible load behaviors associated with different types or scenarios associated with the communication data 108.

The computing system 100 can select the model profile 424 based on various factors. For example, the computing system 100 can select the model profile 424 based on the previous load measures 212, the current load measure 130, or a combination thereof. The computing system 100 can manipulate or fit patterns or lines, as discussed above, for the previous load measures 212, the current load measure 130, derivative thereof, or a combination thereof according to each model or pattern in the behavior model set 428.

Continuing with the example, the computing system 100 can calculate an accuracy measure, such as an error parameter or a confidence measure regarding the fit for the measures using the corresponding model or pattern. The computing system 100 can select the model with the highest accuracy measure as the model profile 424. The computing system 100 can use the fitted patterns or lines of the corresponding model profile 424 as the load profile 214, and thus generate the load projection 216.

For example, the computing system 100 can select the model profile 424 based on the communication context 224. Each of the patterns or models in the behavior model set 428 can correspond to one or more contextual parameters or determinations. As a more specific example, the behavior model set 428 can include patterns or models corresponding to current real-time situation or condition, such as according to a number of connections or a size of the social network for the publishing user, a number of responses or reservations for the live streaming content 110, a status or a title of the publishing user, a connection between the content and current or trending events, or a combination thereof. The computing system 100 can select the model profile 424 as the model or the pattern in the behavior model set 428 matching or corresponding to the communication data 108, the communication context 224, or a combination thereof.

The computing system 100 can extrapolate or generate the load projection 216 based on fitting the selected model profile 424 to existing data, such as the previous load measures 212, the current load measure 130, a derivative thereof, or a combination thereof. The computing system 100 can use the portion of the load profile 214, calculated as discussed above, extending beyond the current time 210.

In some embodiments the computing system 100 can directly calculate the load profile 214 using a solver mechanism 430. The solver mechanism 430 is a method, a process, a function, a circuit, an instruction, a configuration or a combination thereof for directly calculating a curve fitting existing data points. For example, the solver mechanism 430 can include a polynomial solver.

The computing system 100 can use the solver mechanism 430 to directly calculate the load profile 214 from existing data, such as the previous load measures 212, the current load measure 130, a derivative thereof, or a combination thereof. The computing system 100 can directly calculate a curve or a pattern instead of fitting a known pattern or line to the existing data.

In some embodiments, the computing system 100 can calculate the load profile 214 using a machine-learning mechanism 432. The machine-learning mechanism 432 is a method, a process, a function, a circuit, an instruction, a configuration or a combination thereof for learning patterns or behaviors of the load based on available data. The machine-learning mechanism 432 can be used to directly calculate the load profile 214 or to determine and fit the model profile 424.

The computing system 100 can track load levels along with the communication context 224. The computing system 100 can further retroactively calculate the load profile 214 corresponding to previous communications.

The computing system 100 can use the machine-learning mechanism 432 to detect or determine a pattern in the load profile or curves for the loading behavior with respect to various contextual parameters. The computing system 100 can further use the machine-learning mechanism 432 to generate the load projection 216 based on recognizing a pattern for the existing data, such as the previous load measures 212, the current load measure 130, a derivative thereof, or a combination thereof.

At block 412, the computing system 100 can generate the assigned address 314. The computing system 100 can manage traffic or shed loads based on generating the assigned address 314. The computing system 100 can generate the assigned address 314 based on the load projection 216.

For example, the computing system 100 can generate the assigned address 314 based on comparing the load projection 216, such as for estimating the load behavior for the live streaming content 110 for the social networking system 100, and the capacity threshold 132 of FIG. 1. The computing system 100 can determine the capacity threshold 132 representing a capability limit of the access point 121 corresponding to or facilitating the communication data 108. The computing system 100 can determine the capacity threshold 132 based on accessing stored limits or descriptions for the corresponding access point 121.

The computing system 100 can compare the load projection 216 and the capacity threshold 132 to determine whether the load projection 216 or the peak load 222 of FIG. 2 meets or exceeds the capacity threshold 132. The computing system 100 can further determine whether the load projection 216 or the peak load 222 meets or exceeds the capacity threshold 132 within the comparison time threshold 220 of FIG. 2.

The computing system 100 can manage traffic or shed loads when the load projection 216 or the peak load 222 meets or exceeds the capacity threshold 132, such as after the current time 210 or during the comparison time threshold 220. The computing system 100 can manage traffic or shed loads based on directing the end-user devices 104 away from or instead of the corresponding access point 121 to prevent overloading thereof.

For example, the computing system 100 can generate the assigned address 314 for directing the end-user devices 104 to the secondary provider 112 of FIG. 1 different or separate from than the communication controller 102. Also for example, the computing system 100 can generate the assigned address 314 for directing the end-user devices 104 to a different instance of the access point 121 previously unrelated to the communication data 108. The computing system 100 can reconfigure or reallocate the different instance of the access point 121 to facilitate the communication data 108.

The computing system 100 can generate the assigned address 314 at or about the current time 210, and before the future time 218 corresponding to the load projection 216. As illustrated in FIG. 3, the computing system 100 can generate the load projection 216 and subsequently generate the assigned address 314 within or less than the response time 316 of FIG. 3.

For popular content, number of viewers can increase at a rapid rate, such that assigning the address at the current time 210 based on the current load measure 130 will overload the access point 121 due to the few seconds of the delay or lag in the response time 316. As such, the computing system 100 can estimate the load projection 216 for at a time period or rate associated with the response time 316, and generate the assigned address 314.

The computing system 100 can generate the assigned address 314 as discussed above independent of or in addition to the network topology controller mechanism 134. The network topology controller processing rate 136 would be much greater and slower than the response time 316. The network topology controller mechanism 134 would not be able to account for the rapid increase in load due to the network topology controller processing rate 136, and further would not be able to account for the real-time events.

The above describe process to generate the load projection 216 and the assigned address 314 can be implemented dynamically in real-time and at a rate faster than the network topology controller mechanism 134 by at least one order of magnitude. The computing system 100 can generate the load projection 216 and the assigned address 314 in minutes, seconds or less, in comparison to the network topology controller processing rate 136 of an hour or more.

The computing system 100 can generate the assigned address 314 in reacting to the address request 312 to access the communication data 108, and further accounting for real-time events or conditions. The computing system 100 can further interact with the network topology controller mechanism 134, such as providing feedback information based the assigned address 314, the content time 206, the load profile 214 or the load projection 216, or a combination thereof.

The above describe process to generate the load projection 216 and the assigned address 314 can be implemented during the communication or in anticipation for the communication of the communication data 108. For example, the computing system 100 can generate the load projection 216 and the assigned address 314 as users request to access the ongoing communication data 108 started before the current time 210.

Also for example, the zero or the left most point in FIG. 2 can be before the content start time 208 with the load correspond to a number of users reserving or already connected to watch the live streaming content 110 before the content start time 208. The corresponding level can be an estimate of the load based on the number of reserved viewers.

Also for example, the computing system 100 can offset or shift the load profile 214 or reshape the model profile 424 according to the number of reserved viewers. The computing system 100 can use the number of reserved viewers determined at block 404.

At block 414, the computing system 100 can send the assigned address 314. The computing system 100 can send the assigned address 314 as illustrated in the block 306. As such, the end-user devices 104 can use the assigned address 314 to access the communication data 108 using or through the secondary provider 112 or the previously unrelated instance of the access point 121 when the load projection 216 at the originally intended or facilitating instance of the access point 121 meets or exceeds the capacity threshold 132.

It has been discovered that the load projection 216 generated using load measurements made in real-time, such as the current load measure 130 and the previous load measures 212, improves computer functionalities by reducing or eliminating overloads for the access points 121 for rapidly increasing loads. The load projection 216 can be generated using real-time measurements to reflect the actual conditions. The load projection 216 can further be generated based on recognizing scenarios or conditions corresponding to rapid increase in traffic using the load characterization mechanism 420. The load projection 216 can further be generated within the response time 316. As such, the load projection 216 can be used to recognize and prevent possible scenarios where the load during dead time reaches or exceeds the capacity threshold 132.

It has further been discovered that generating the load projection 216 using the pattern fitting mechanism 422 improves computer functionalities by reducing or eliminating overloads without a large increase in processing. The computing system 100 can use the model profile 424 characteristic of scenarios or conditions corresponding to rapid increase in traffic, such as for the social networking system 100 broadcasting the live streaming content 110 from a celebrity or a well-recognized user. The computing system 100 can fit the model profile 424 based on simple processes as discussed above, which does not require a lot of extra processing. As such, the curve fitting function can be used efficiently and within the necessary time window to accurately predict the load. The accurate prediction of the upcoming load levels can be used to shed or divert traffic away from corresponding access points 121 to prevent overloading conditions.

While processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. For example, blocks 404 and 408 can be merged or looped, with the block 406 serving as a break condition for moving to block 410. Also for example, blocks 404 and 406 can be merged for anticipating exchange of the communication data 108.

Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

For illustrative purposes, the computing system 100 has been described above in the context of the social networking system. However, it is understood that the computing system 100 can be applicable to different contexts, such as on-line meetings or virtual workspaces, broadcast events including sporting events or current events, online gaming platform, etc.

Also for illustrative purposes, the computing system 100 has been described above in the context of the live streaming content 110 of FIG. 1. However, it is understood that the computing system 100 can be applicable to different contexts, such as for accessing other stored streaming media, such as for content-on-delivery type of systems, or for distribution systems for initial distribution of popular content including music or movies, applications, online games, etc.

Figure 5:
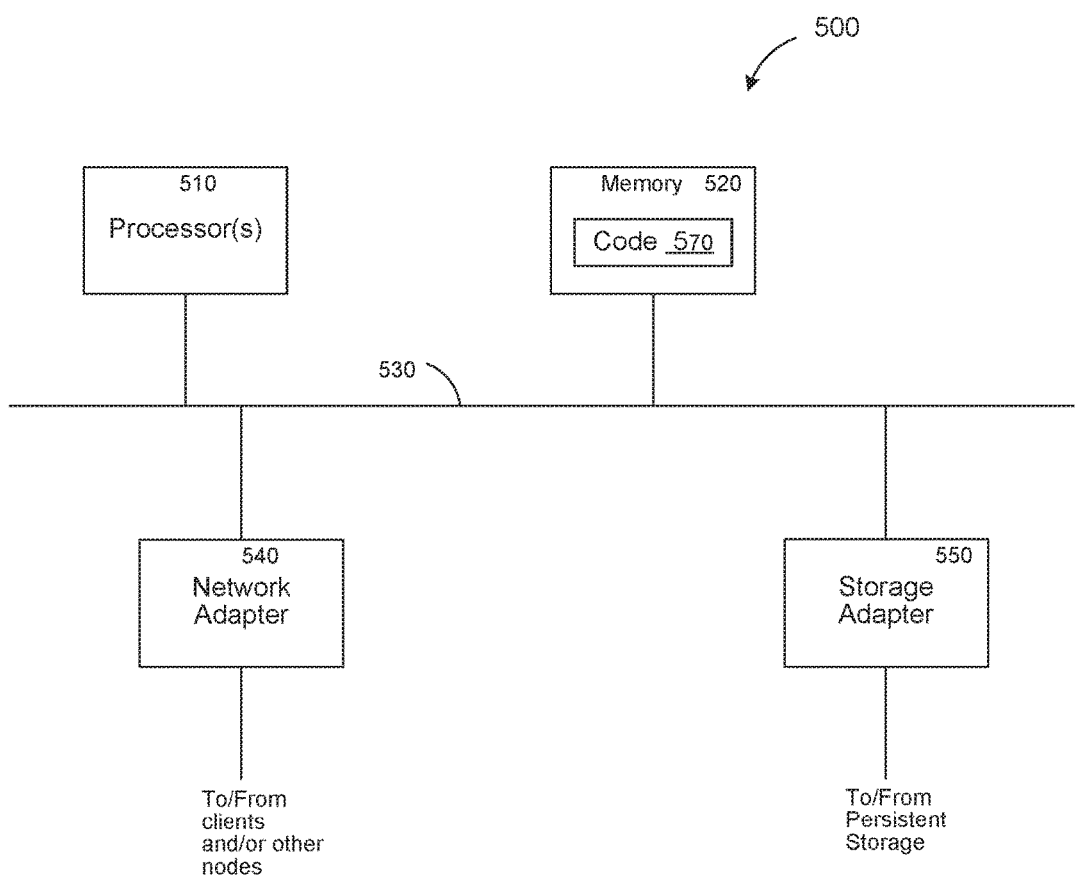
FIG. 5 is a block diagram of an example of a communicating device, which may represent one or more communicating device or server described herein, in accordance with various embodiments.

FIG. 5 is a block diagram of an example of a communicating device 500, which may represent one or more communicating device or server described herein, in accordance with various embodiments. The communicating device 500 can include one or more computing devices that implement the computing system 100 of FIG. 1. The communicating device 500 can execute at least part of the method 400 of FIG. 4. The communicating device 500 includes one or more processors 510 and memory 520 coupled to an interconnect 530. The interconnect 530 is an abstraction that represents any one or more separate physical buses, point-to-point connections, or both connected by appropriate bridges, adapters, or controllers. The interconnect 530, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire". The interconnect 530 can also include wireless connection or communications between components.

The processor(s) 510 is/are the central processing unit (CPU) of the communicating device 500 and thus controls the overall operation of the communicating device 500. In certain embodiments, the processor(s) 510 accomplishes this by executing software or firmware stored in memory 520. The processor(s) 510 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 520 is or includes the main memory of the communicating device 500. The memory 520 represents any form of random access memory (RAM), read-only memory (ROM), flash memory, or the like, or a combination of such devices. In use, the memory 520 may contain a code 570 containing instructions according to the mesh connection system disclosed herein.

Also connected to the processor(s) 510 through the interconnect 530 are a network adapter 540 and a storage adapter 550. The network adapter 540 provides the communicating device 500 with the ability to communicate with remote devices, over a network and may be, for example, an Ethernet adapter, Fibre Channel adapter, or a wireless modem. The network adapter 540 may also provide the communicating device 500 with the ability to communicate with other computers. The storage adapter 550 enables the communicating device 500 to access a persistent storage, and may be, for example, a Fibre Channel adapter or SCSI adapter.

The code 570 stored in memory 520 may be implemented as software and/or firmware to program the processor(s) 510 to carry out actions described above. In certain embodiments, such software or firmware may be initially provided to the communicating device 500 by downloading it from a remote system through the communicating device 500 (e.g., via network adapter 540).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; and/or optical storage media; flash memory devices), etc.

The term "logic," as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification. Reference in this specification to "various embodiments" or "some embodiments" means that a particular feature, structure, or characteristic described in connection with the embodiment is included in at least one embodiment of the disclosure. Alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments. Reference in this specification to where a result of an action is "based on" another element or feature means that the result produced by the action can change depending at least on the nature of the other element or feature.

What is claimed is:

1. A computer-implemented method, comprising:
    identifying communication of data;
    determining a current load measure for characterizing a measure of data that exits a network, associated with the data at a current time, wherein the current load measure is for an access point of a computing system;
    generating, using at least one processor, a load projection based on the current load measure, wherein the load projection is for characterizing the measure of data that exits the network at the access point corresponding to a future time;
    generating an assigned address based on the load projection, wherein the assigned address is generated before the future time for accessing the data, further wherein diverting network traffic to the assigned address predictively reduces network load at the access point of the computing system; and
    determining a capacity threshold for representing a limit on capability of the access point; and
    wherein:
        generating the load projection includes generating the load projection for estimating the measure of data that exits the network occurring after the current time across proxy nodes of the access point; and
        generating the assigned address includes generating the assigned address based on comparing the capacity threshold and the load projection, wherein the assigned address is for accessing the data including live streaming content.

2. The computer-implemented method of claim 1, further comprising:
    accessing a previous load measure representing the measure of data that exits the network that occurred before the current time; and
    wherein:
        generating the load projection includes extrapolating the load projection according to the previous load measure and the current load measure using a pattern fitting mechanism.

3. The computer-implemented method of claim 1, wherein generating the assigned address includes generating the assigned address independent of a network topology controller mechanism for controlling the assigned address.

4. The computer-implemented method of claim 1, wherein generating the load projection includes generating the load projection using the at least one processor corresponding to a web machine.

5. The computer-implemented method of claim 1, wherein:
    generating the load projection includes generating the load projection for representing the measure of data that exits a network at the access point of a communication controller; and
    generating the assigned address includes generating the assigned address for directing an end-user device to a secondary provider to access the data, wherein the secondary provider is different than the communication controller.

6. The computer-implemented method of claim 1, further comprising:
    determining previous load measures representing instances of the measure of data that exits the network that occurred at different moments before the current time; and
    wherein:
        generating the load projection includes calculating a load profile at the current time based on the previous load measures and the current load measure, wherein the load profile includes the load projection.

7. The computer-implemented method of claim 1, further comprising:
    determining previous load measures representing instances of the measure of data that exits the network that occurred at different moments before the current time; and
    wherein:
        generating the load projection includes generating the load projection based on implementing a machine-learning mechanism using the previous load measures and the current load measure.

8. The computer-implemented method of claim 1, wherein:
    generating the load projection includes generating the load projection for representing the measure of data that exits the network at the access point of a communication controller; and
    generating the assigned address includes generating the assigned address for directing an end-user device to a further access point of the communication controller.

9. A computer-implemented method, comprising:
    identifying communication of data;
    determining a current load measure for characterizing a measure of data that exits a network, associated with the data at a current time, wherein the current load measure is for an access point of a computing system;

generating, using at least one processor, a load projection based on the current load measure, wherein the load projection is for characterizing the measure of data that exits the network at the access point corresponding to a future time;

generating an assigned address based on the load projection, wherein the assigned address is generated before the future time for accessing the data, further wherein diverting network traffic to the assigned address predictively reduces network load at the access point of the computing system; and determining previous load measures representing instances of the measure of data that exits the network that occurred at different moments before the current time; and wherein:
generating the load projection includes:
determining a model profile from a behavior model set, wherein the model profile matches the previous load measures and the current load measure, and
extrapolating the load projection according to the model profile.

10. A computer-implemented method, comprising:
identifying communication of data;
determining a current load measure for characterizing a measure of data that exits a network, associated with the data at a current time, wherein the current load measure is for an access point of a computing system;
generating, using at least one processor, a load projection based on the current load measure, wherein the load projection is for characterizing the measure of data that exits the network at the access point corresponding to a future time;
generating an assigned address based on the load projection, wherein the assigned address is generated before the future time for accessing the data, further wherein diverting network traffic to the assigned address predictively reduces network load at the access point of the computing system; and
determining previous load measures representing instances of the measure of data that exits the network that occurred at different moments before the current time; and
wherein:
generating the load projection includes calculating a load profile based on line-fitting with a spline profile according to the previous load measures and the current load measure, wherein the load profile includes the load projection beyond the current time.

11. The computer-implemented method of claim 10, further comprising:
determining a communication context associated with the data;
wherein:
generating the load projection includes generating the load projection based on the spline profile corresponding to the communication context.

12. The computer-implemented method of claim 10, further comprising:
calculating a derivative measure based on the previous load measures, the current load measure, or a combination thereof; and wherein:
generating the load projection includes calculating the load profile based on line-fitting according to the derivative measure.

13. The computer-implemented method of claim 12, wherein generating the assigned address includes generating the assigned address at a rate faster than a network topology controller mechanism by at least one order of magnitude, wherein the network topology controller mechanism is for controlling the assigned address.

14. The computer-implemented method of claim 10, wherein generating the assigned address includes generating the assigned address by a response time in reacting to a client request to access the data, wherein the response time is less than a minute.

15. The computer-implemented method of claim 10, wherein:
the data includes live streaming content that started before the current time; and
determining the current load measure includes characterizing the measure of data that exits the network at the access point of a social networking system.

16. A computer readable data storage memory storing computer-executable instructions that, when executed by a computing system, cause the computing system to perform a computer-implemented method, the instructions comprising:
instructions for identifying communication of data;
instructions for determining a current load measure for characterizing a measure of data that exits a network, associated with the data at a current time, wherein the current load measure is for an access point of the computing system;
instructions for generating a load projection based on the current load measure, wherein the load projection is for characterizing the measure of data that exits the network at the access point corresponding to a future time;
instructions for generating an assigned address based on the load projection, wherein the assigned address is generated before the future time for accessing the data, further wherein diverting network traffic to the assigned address predictively reduces network load at the access point of the computing system; and
instructions for determining previous load measures representing instances of the measure of data that exits the network across proxy nodes of the access point that occurred at different moments before the current time; and
wherein:
the instructions for generating the load projection include instructions for calculating a load profile based on line-fitting with a spline profile according to the previous load measures and the current load measure, wherein the load profile includes the load projection beyond the current time and is for estimating the measure of data that exits the network across the proxy nodes.

17. A computing system, comprising:
one or more processors configured to:
identify communication of data;
determine a current load measure for characterizing a measure of data that exits a network, measure associated with the data at a current time, wherein the current load measure is for an access point of the computing system;

determine previous load measures representing instances of the measure of data that exits the network that occurred at different moments before the current time;

generate a load projection based on the current load measure, wherein the load projection is for characterizing the measure of data that exits the network at the access point corresponding to a future time, wherein generating the load projection includes calculating a load profile based on line-fitting with a spline profile according to the previous load measures and the current load measure, wherein the load profile includes the load projection beyond the current time; and generate an assigned address based on the load projection, wherein the assigned address is generated before the future time for accessing the data; and memory, coupled to the one or more processors, configured to store the load projection.

* * * * *